Figure 1:
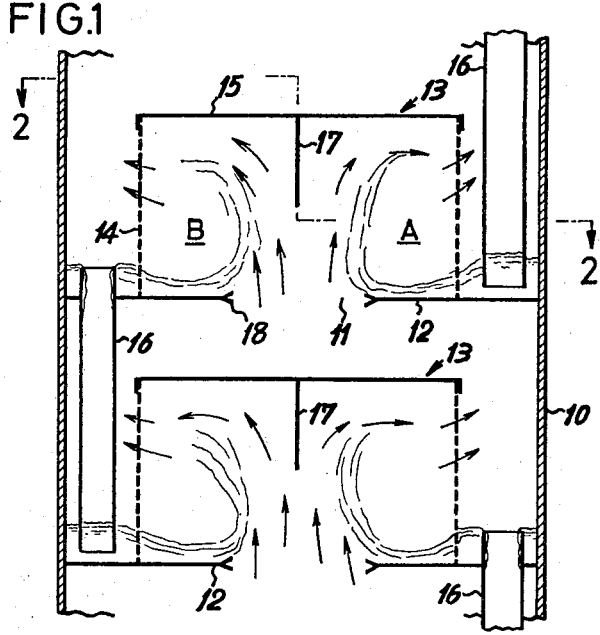

United States Patent [19]
Tanigawa et al.

[11] 3,779,526
[45] Dec. 18, 1973

[54] GAS-LIQUID CONTACTING APPARATUS

[75] Inventors: Shogo Tanigawa; Takesi Yokoyama, both of Tamano; Kouichi Karakawa, Toyama, all of Japan

[73] Assignee: Mitsui Shipbuilding and Engineering Co. Ltd., Tokyo, Japan

[22] Filed: Aug. 19, 1971

[21] Appl. No.: 173,149

[52] U.S. Cl. .............................. 261/114 R, 55/257
[51] Int. Cl. ............................................ B01d 3/26
[58] Field of Search ................... 261/114 R, 114 A, 261/114 VT, 114 JP, 113; 55/223, 240, 255, 256, 257

[56] References Cited
UNITED STATES PATENTS

| 1,918,005 | 7/1933 | Urquhart .......................... 261/114 R |
| 2,778,621 | 1/1957 | Zimmerman, Jr. ............. 261/114 A |
| 2,784,953 | 3/1957 | Ng .................................. 261/114 JP |
| 2,819,049 | 1/1958 | Manning, Jr. et al. ........... 261/114 A |
| 3,037,754 | 6/1962 | Glitsch .......................... 261/114 VT |
| 3,633,882 | 1/1971 | Karakawa et al. .............. 261/114 R |

FOREIGN PATENTS OR APPLICATIONS

| 51,208 | 9/1938 | Netherlands ..................... 261/114 A |
| 884,345 | 6/1953 | Germany ......................... 261/114 A |

Primary Examiner—Tim R. Miles
Assistant Examiner—Steven H. Markowitz
Attorney—Charles H. Howson, Jr. et al.

[57] ABSTRACT

A gas-liquid contacting apparatus provided with vertically spaced trays having gas flow aperture therein and a contacting structure provided on the trays surrounding the aperture. The contacting structure has a cover for preventing gas and liquid to ascending. The edge of said aperture is formed in a sawteeth shape.

3 Claims, 2 Drawing Figures

GAS-LIQUID CONTACTING APPARATUS

The present invention relates to a gas-liquid contacting apparatus for heat or mass transfer such as distillation apparatus or absorption apparatus in the chemical industry.

An object of the present invention is to provide a gas-liquid containing apparatus by which liquid is broken into fine particles so that a high contacting efficiency is obtained. The gas-liquid contacting apparatus according to the present invention has a gas-flow aperture in the tray and the inner edge of the aperture is formed in a sawteeth shape.

Figure 2:
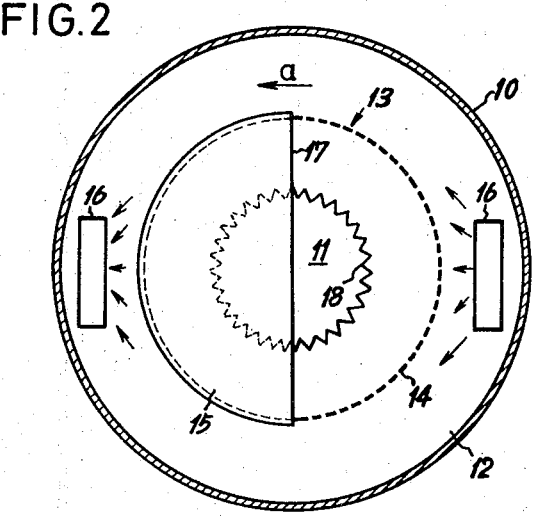

In the drawings:

FIG. 1 is a vertical sectional view of a gas-liquid contacting apparatus according to the present invention; and FIG. 2 is a sectional view taken on line 2—2 in FIG. 1.

Referring to the drawings, trays 12 each having an aperture 11 at a central portion thereof are provided in a column 10 at suitable spacing. Each tray 12 is provided with a cylindrical gas-liquid contacting structure 13. The gas-liquid contacting structure comprises a perforated cylinder 14 and a cover 15. Each tray 12 is also provided with a downcomer 16 outside of the structure 13, the downcomer projecting upwardly from the tray to maintain liquid thereon at a predetermined depth, and the lower end of the downcomer being near the lower tray. Each downcomer is arranged in alternately diametrically opposite position at every tray. In the gas-liquid contacting structure, a partition plate 17 is disposed at a right angle to the flowing direction of liquid on the tray indicated by the arrow "a" in FIG. 2. The inner edge of the aperture 11 is formed in a sawteeth shape as shown in FIG. 2.

Liquid on the tray 12 overflows into the top of the downcomers 16 and flows down along the inside walls thereof. Liquid is maintained on the tray 12 at a level determined by height of the upper end of the downcomer and passes through the perforations of the cylinder 14 to the inside of the contacting structure and flows toward the aperture 11 of the tray 12 by the head of liquid. The liquid having passed over the edge of the aperture 11 is entrained in the gas by ascending through the aperture without falling down through the aperture. Thus the liquid and gas are formed into the gas-liquid mixing flow in the contacting structure. The gas-liquid mixing flow ascends in the contacting structure and is diverted by the cover 15, and passes through the perforations of the cylinder 14. Gas is separated from liquid when the flow passes through the perforations and the gas ascends to the next upper contacting structure. When it passes through the perforations, the atomized liquid is collected and grows into drop or flow, and thus the liquid flows down the outside of the cylinder 14 to the pool maintained on the tray 12. The liquid fallen on the pool is introduced again in the contacting structure through perforations down stream.

Thus the liquid is circulated and repeatedly contacts with gas. The partition plate 17 provided in the contacting structure 13 assures the circulation of liquid as hereinafter described.

Liquid flows from the downcomer 16 as shown by arrows in FIG. 2, and enters into the room A formed by the partition plate 17 and flows from the room A after contacting with gas. Then the liquid flows in the direction of the arrow "a," enters into the room B and contacts again with gas in the room B. Thereafter the liquid flows from the room B and down through the downcomer 16. Thus liquid contacts with gas at least two times.

In accordance with the present invention, the sawteeth which form the edge of aperture 11 of the tray tend to break up the liquid film on the tray so that the liquid is easily atomized into fine particles by the gas ascending through the aperture. Therefore, contacting efficiency is further increased.

What is claimed is:

1. In a gas-liquid contacting apparatus comprising an upright column in which the gas flows upwardly, at least one tray mounted transversely in said column and having means for maintaining liquid thereon at a predetermined depth and a gas-flowing opening therein, upwardly through which the gas is adapted to flow, contacting structure surrounding said opening comprising a wall projecting upwardly from said tray and having means below said predetermined depth of liquid to permit discharge of the liquid from the tray into said structure, a cylinder mounted on said wall having perforations above said predetermined depth to permit gas to flow outwardly therethrough, and a cover on said perforated cylinder, said structure being designed so that the liquid from said tray within said structure is blown up by the gas ascending through the gas-flow opening of the tray, the improvement wherein said gas-flow opening is serrated around its periphery to break up the liquid film on the tray within said contact structure.

2. A gas-liquid contacting apparatus according to claim 1 wherein the serration of the gas-flow opening is in the form of saw teeth.

3. A gas-liquid contacting apparatus according to claim 1 including a series of trays mounted transversely in said column in vertically-spaced relation, said means for maintaining the liquid at a predetermined level upon each tray including downcomer means to transfer liquid from an upper tray to the next lower tray and arranged so that the gas does not flow upwardly through said downcomer means, said downcomer means for the next lower tray being positioned at the opposite side of the column from the downcomer means for the upper tray, whereby the liquid is directed to flow across said tray from said upper downcomer means to said next downcomer means, and a vertical plate disposed transversely to said flow direction within said perforated cylinder wall.

\* \* \* \* \*

UNITED STATES PATENT OFFICE
CERTIFICATE OF CORRECTION

Patent No. 3,779,526          Dated December 18, 1974

Inventor(s) Shogo Tanigawa; Takesi Yokoyama and Kouichi Karakawa

It is certified that error appears in the above-identified patent and that said Letters Patent are hereby corrected as shown below:

In the heading before [52] U.S. Cl., the following should be added:

[30] Foreign Application Priority Data

August 21, 1970     Japan..........83719/1970

Column 1, line 8, "containing" should be --contacting--;

line 33, "disposed" should be --provided--;

Claim 1, line 5, "gas-flowing" should be --gas-flow--.

Signed and sealed this 23rd day of July 1974.

(SEAL)
Attest:

McCOY M. GIBSON, JR.            C. MARSHALL DANN
Attesting Officer               Commissioner of Patents